US008322735B2

(12) United States Patent
Steinbach

(10) Patent No.: US 8,322,735 B2
(45) Date of Patent: Dec. 4, 2012

(54) FREESTYLE SCOOTER

(76) Inventor: Robert Steinbach, Vienna (AT)

( * ) Notice: Subject to any disclaimer, the term of this patent is extended or adjusted under 35 U.S.C. 154(b) by 542 days.

(21) Appl. No.: 12/550,395

(22) Filed: Aug. 30, 2009

(65) Prior Publication Data

US 2010/0059955 A1   Mar. 11, 2010

Related U.S. Application Data

(60) Provisional application No. 61/094,844, filed on Sep. 5, 2008.

(51) Int. Cl.
*B62M 1/00* (2010.01)
(52) U.S. Cl. .............................. 280/87.041; 280/87.021
(58) Field of Classification Search ............... 280/87.01, 280/87.021, 87.041, 63, 281.1
See application file for complete search history.

(56) References Cited

U.S. PATENT DOCUMENTS

| | | | | |
|---|---|---|---|---|
| 1,591,581 A * | 7/1926 | Trejo | ........................... | 280/7.12 |
| 1,664,858 A * | 4/1928 | Headley | ................... | 280/87.041 |
| 1,689,916 A * | 10/1928 | Fisher | ....................... | 280/87.041 |
| 1,844,305 A * | 2/1932 | White | ......................... | 280/7.12 |
| 3,179,433 A * | 4/1965 | Flack | ............................. | 280/8 |
| 3,620,547 A * | 11/1971 | Vaverek | .................... | 280/87.042 |
| 4,203,610 A * | 5/1980 | Mihalik | .................... | 280/87.041 |
| 4,204,698 A * | 5/1980 | Mihalik | .................... | 280/87.041 |
| 4,669,746 A * | 6/1987 | Wu | ................................. | 280/221 |
| D292,221 S * | 10/1987 | Mueller | ........................ | D21/423 |
| 4,705,286 A * | 11/1987 | Lauzier et al. | ............. | 280/281.1 |
| D295,428 S * | 4/1988 | Cummings | ................... | D21/423 |
| 4,761,014 A * | 8/1988 | Huang | .......................... | 280/258 |
| D300,756 S * | 4/1989 | Cummings | ................... | D21/423 |
| 4,824,131 A * | 4/1989 | Thay | ............................... | 280/278 |
| D301,157 S * | 5/1989 | Hess | ............................. | D21/423 |
| D305,134 S * | 12/1989 | Rubio et al. | .................. | D21/423 |
| 5,039,121 A * | 8/1991 | Holter | .......................... | 280/220 |
| 5,072,961 A * | 12/1991 | Huppe | .......................... | 280/278 |
| 5,328,193 A * | 7/1994 | Shiew | ....................... | 280/87.041 |
| 5,470,089 A * | 11/1995 | Whitson et al. | ........... | 280/87.041 |
| D392,001 S * | 3/1998 | Chen | ............................. | D21/423 |
| 5,785,331 A * | 7/1998 | Rappaport | ................. | 280/87.041 |
| 5,899,474 A * | 5/1999 | Grutzik | ......................... | 280/229 |
| 5,992,864 A * | 11/1999 | Dickson et al. | ........... | 280/87.041 |
| 6,135,474 A * | 10/2000 | Nakamura | ..................... | 280/216 |
| 6,149,177 A * | 11/2000 | Valdez | .......................... | 280/291 |
| 6,250,656 B1 * | 6/2001 | Ibarra | ....................... | 280/87.041 |
| 6,273,439 B1 * | 8/2001 | Ray et al. | ................. | 280/87.041 |
| 6,279,929 B1 * | 8/2001 | Fruechtenicht | .......... | 280/87.041 |
| 6,378,879 B2 * | 4/2002 | Rappaport | ................. | 280/87.041 |
| 6,450,516 B1 * | 9/2002 | Nall, III | .................. | 280/87.021 |
| 6,488,295 B1 * | 12/2002 | Bryant | ..................... | 280/87.042 |
| 6,588,784 B1 * | 7/2003 | Chen | ............................. | 280/221 |
| 6,648,355 B2 * | 11/2003 | Ridenhour | .................... | 280/255 |

(Continued)

*Primary Examiner* — Hau Phan
*Assistant Examiner* — Jacob Meyer
(74) *Attorney, Agent, or Firm* — Smartpat PLC; Axel Nix

(57) ABSTRACT

A scooter is presented which allows the rider to maintain a secure forward facing stance with both feet parallel to the direction of travel and a combined center of gravity of both rider and scooter centrally between the front and rear wheel irrespective of the vertical tilt of the scooter. The scooter comprises a frame with high torsional strength, suitable for attaching an adjustable footrest thereto. The footrest may comprise two footrests, one on each side of the frame, or a footboard sufficiently wide to allow the rider to place both feet parallel to the direction of travel thereon. The longitudinal position of the footrests or footboard may be adjustable by selectively attaching the footrests or footboard to one of two or more attachment features at the frame.

20 Claims, 7 Drawing Sheets

U.S. PATENT DOCUMENTS

| | | | |
|---|---|---|---|
| 6,659,486 B2 * | 12/2003 | Eschenbach | 280/221 |
| 6,739,606 B2 * | 5/2004 | Rappaport | 280/87.041 |
| D492,367 S * | 6/2004 | Dennis | D21/423 |
| 6,854,752 B2 * | 2/2005 | Chao | 280/278 |
| D503,661 S * | 4/2005 | Huntsberger et al. | D12/111 |
| 7,261,310 B2 * | 8/2007 | Yifrah et al. | 280/278 |
| 7,458,596 B1 * | 12/2008 | Serna | 280/291 |
| 7,487,982 B2 * | 2/2009 | Chan | 280/87.01 |
| 7,543,829 B1 * | 6/2009 | Barnes | 280/62 |
| 7,803,090 B2 * | 9/2010 | Kraus | 482/62 |
| 7,951,049 B2 * | 5/2011 | Mondello et al. | 482/57 |
| 2002/0070519 A1 * | 6/2002 | Rappaport | 280/87.041 |
| 2002/0093161 A1 * | 7/2002 | Udwin et al. | 280/87.05 |
| 2002/0121754 A1 * | 9/2002 | Nall, III | 280/87.021 |
| 2003/0001350 A1 * | 1/2003 | Eschenbach | 280/63 |
| 2003/0127822 A1 * | 7/2003 | Fleck et al. | 280/259 |
| 2003/0132592 A1 * | 7/2003 | Dombroski | 280/87.01 |
| 2003/0193159 A1 * | 10/2003 | Ridenhour | 280/255 |
| 2003/0214113 A1 * | 11/2003 | Bank | 280/282 |
| 2004/0004341 A1 * | 1/2004 | Carr et al. | 280/256 |
| 2004/0012166 A1 * | 1/2004 | Reginato | 280/87.041 |
| 2004/0080130 A1 * | 4/2004 | Lewis | 280/87.041 |
| 2005/0248117 A1 * | 11/2005 | Hung | 280/221 |
| 2005/0253357 A1 * | 11/2005 | Chang et al. | 280/283 |
| 2005/0285368 A1 * | 12/2005 | Yifrah et al. | 280/287 |
| 2006/0076752 A1 * | 4/2006 | Montague et al. | 280/279 |
| 2006/0186641 A1 * | 8/2006 | Chan | 280/638 |
| 2007/0278763 A1 * | 12/2007 | Saville | 280/269 |
| 2009/0212529 A1 * | 8/2009 | Stenberg | 280/287 |
| 2010/0253036 A1 * | 10/2010 | Liu et al. | 280/210 |

* cited by examiner

FREESTYLE SCOOTER

CROSS REFERENCE TO RELATED APPLICATIONS

This applications claims priority to provisional application No. 61/094,844, which was filed on Sep. 5, 2008.

TECHNICAL FIELD

The present invention generally relates to scooters, and more particularly, to scooters suitable to perform freestyle tricks.

BACKGROUND OF THE INVENTION

Scooter type vehicles which are propelled by impulses from one foot on the ground while the other foot rests on a long elongated platform or foot board supported by front and rear wheels and provided at its forward end with a suitable steering post or column are well known in the art. An early disclosure of a scooter can be found in U.S. Pat. No. 1,689,916, which is hereby incorporated by reference thereto.

Traditionally, scooters consist of a frame having one or two tubes bent to provide a mounting platform for a footboard. Connected to the front of the frame is a rigid yoke, which holds the stem of a front fork, in which a front wheel is mounted. The upper end of the stem is connected to a steering column, which is coupled to a handle bar. A rear wheel is coupled to the rear end of the frame. At least one of the wheels is connected to a brake.

U.S. Pat. No. 6,279,929 and U.S. D292221 disclose two exemplary scooters. The footboards in the disclosed scooters do not allow the rider to place both feet next to each other parallel to the direction of travel. Therefore, the rider cannot assume an optimal body position while maintaining equilibrium when riding the scooter. This limits the rider's ability to operate the scooter and perform freestyle tricks. U.S. Pat. No. 6,279,929 is hereby incorporated by reference thereto.

The rider's posture when riding a scooter is determined primarily by the position of the rider's hands when holding the handle bar relative to the rider's feet when standing at the center of the footboard. In traditional scooters the vertical distance of footboard to handle bar is significantly more than 1.5 times its horizontal distance. These proportions prevent the rider from taking an optimal stance.

U.S. patent application Ser. No. 10/145,501 (publication 20030132592), which is hereby incorporated by reference thereto, discloses an all-terrain trick scooter comprising an upright head tube, a main tube extending downward from said head tube, two rear fork arms extending out from the lower end of said main tube, a pair of rear axle seats attached to each said rear fork arms, a pair of rear foot pegs extending out laterally from the lower end of said frame, a rear wheel connected to said rear axle seats, a front fork including a fork shaft and two prongs extending downwardly therefrom, a pair of front axle seats attached to the lower end of said prongs, a pair of front foot pegs extending out laterally from said front axle seats, a front wheel connectable to said front axle seats, a handlebar connectable to said fork shaft of said front fork, a means of braking both wheels utilizing hand brakes coupled to said handlebars.

The problem, however, is that a scooter comprising a single main tube frame is not sufficiently strong and torsionally rigid to be used for freestyle sports. Also, the disclosed scooter comprises front and rear pegs located at each wheel for the rider to stand on when travelling. These pegs offer insufficient support for the rider to attain a secure stance. The location of the pegs close to the front and rear wheels makes it difficult for the rider to attain stable equilibrium.

What is therefore needed is an improved scooter which provides optimized proportions to enable the rider to perform freestyle tricks.

SUMMARY OF THE INVENTION

In one aspect of the present invention a scooter is presented which allows the rider to maintain a secure forward facing stance with both feet parallel to the direction of travel and a combined center of gravity of both rider and scooter centrally between the front and rear wheel irrespective of the vertical tilt of the scooter, e.g. when driving through a pipe, pipe transition or while jumping.

In another aspect of the invention the scooter comprises a frame with high torsional strength, suitable for attaching an adjustable footrest thereto. The footrest may comprise two bicycle pedal-shaped footrests, one on each side of the frame, or a footboard. The longitudinal position of the footrests or the footboard may be adjustable by selectively attaching the footrests or the footboard to one of two or more attachment features at the frame.

In yet another aspect of the invention the scooter comprises a footboard sufficiently wide to place both driver's feet next to each other facing forward, and a handle bar for steering the scooter. The vertical distance of footboard to handle bar is about 1.5 times its horizontal distance, thereby allowing the rider to attain a stance optimal for performing tricks, operate the scooter in park- or street freestyle fashion, or BMX race, dirt jump, slope style and downhill disciplines. More specifically, the vertical distance of footboard to handle bar may be between 1.4 and 1.6 times its horizontal distance.

In a further aspect of the present invention the total mass of the scooter is kept low, in order to allow operation by younger adults and children without sacrificing freestyle capabilities.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
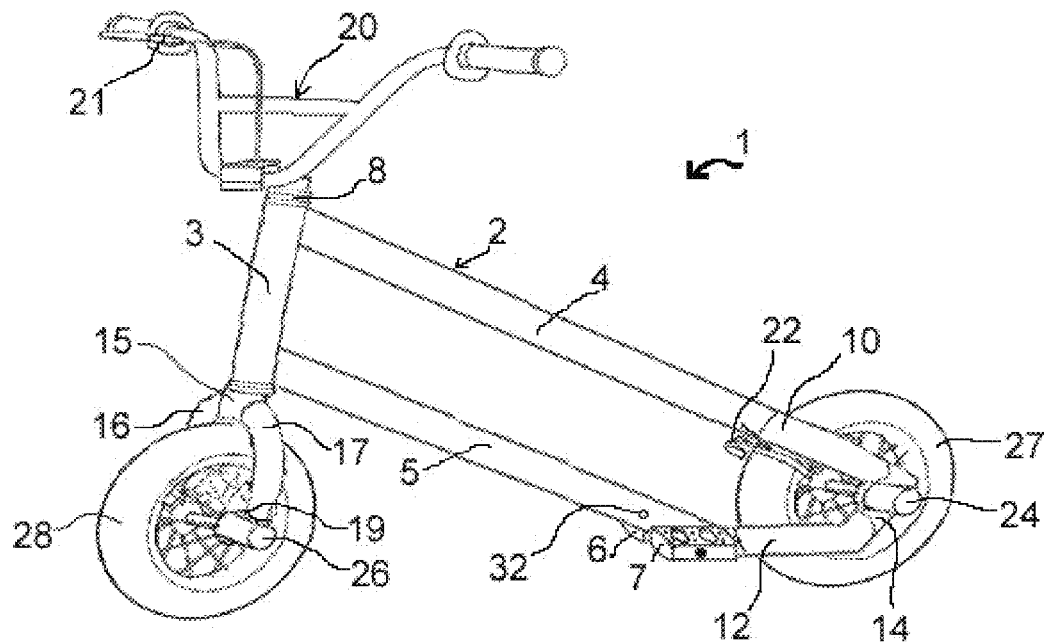
FIG. 1 is a perspective view of a scooter according to an aspect of the invention.
Figure 2:
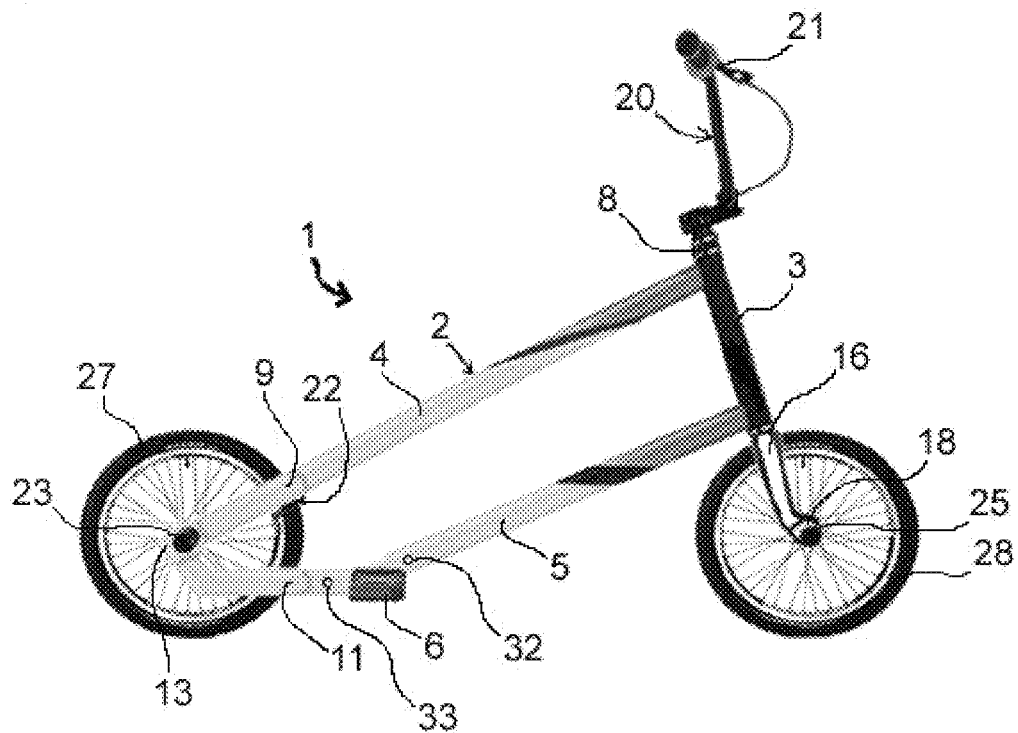
FIG. 2 is a side view of the scooter as in FIG. 1.
Figure 3:
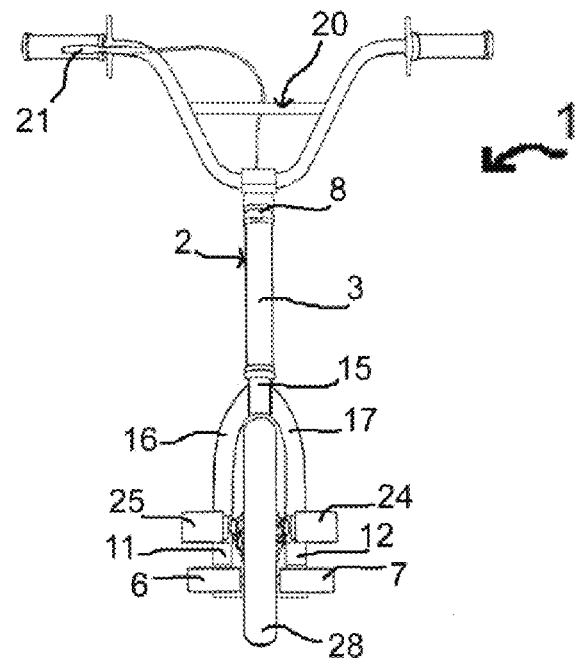
FIG. 3 is a front view of the scooter as in FIG. 1.
Figure 4:
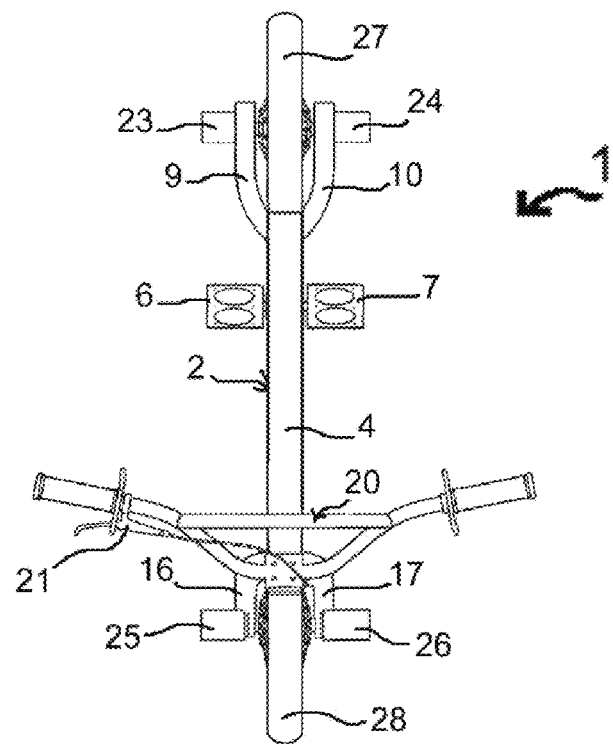
FIG. 4 is a top view of the scooter as in FIG. 1.

Referring to FIGS. 1 through 4, an exemplary scooter 1 in which the principles of the present invention may be advantageously practiced, is illustrated generally. The scooter comprises frame 2. The front end of frame 2 is formed by head tube 3, to which upper frame tube 4 and lower frame tube 5 are firmly attached. At its rear end upper frame tube 4 extends into upper left fork arm 10 and upper right fork arm 9. At its rear end lower frame tube 4 extends into lower left fork arm 12 and lower right fork arm 11. Alternatively, lower and upper fork arms 9, 10, 11, and 12 may be separate elements that are connected to the lower frame tube 4 and upper frame tube 5.

Upper left fork arm 10 and lower left fork arm 12 are joined together at left rear axle seat 14. Correspondingly, upper right fork arm 9 and lower right fork arm 11 are joined together at right rear axle seat 13. Rear wheel 27 is located between left rear axle seat 14 and right rear axle seat 13. Left rear peg 24 is attached to left rear axle seat 14 facing outward. Right rear peg 23 is attached to right rear axle seat 13 facing outward. Rear pegs 23 and 24 provide a temporary resting place for the rider's feet while performing tricks. Rear pegs 23 and 24 may be an extension of the axle of rear wheel 27.

Lower frame tube 5 comprises two or more attachment features 32, 33 and 34 for selectively attaching a footrest. The footrest may be a footboard or, as illustrated, comprise a left footrest 7 and a right footrest 6. The plurality of attachment features 32, 33 and 34 provides multiple different mounting locations for footrests 6 and 7 along lower frame tube 5. The rearmost attachment feature 33 is located more than 20% of the wheel base distance forward of the rear wheel, the foremost attachment feature 32 is located more than 50% of the wheel base distance rearward of the front wheel. Hence, the attachment features are located between 20% and 50% of the wheel base distance forward of the rear wheel. This allows adjusting the horizontal position of the footrest and thereby accommodating riders of different sizes. Footrests 6 and 7 may be able to rotate around their central axis, which is connected to attachment feature 32, 33 or 34. Footrests 6 and 7 may be standard bicycle pedals, allowing the footrest to rotate freely around their mounting axis. Alternatively, footrests 6 and 7 may be unique scooter footrests, allowing rotation only within a limited predetermined angular range around their mounting axis. Attachment features 32, 33 and 34 may consist of threaded openings configured to accept a standard bicycle pedal having a screw thread mount. The footrest's mounting axis may be securely screwed into the threaded opening attachment feature. While an exemplary embodiment with three attachment features has been illustrated it should be appreciated that any number of attachment features or a continuously variable mechanism can be used to provide the desired adjustability of the footrest position between the rear wheel 27 and front wheel 28.

Scooter 1 comprises a front fork shaft 15. The lower end of front fork shaft 15 extends into a left prong 17 and a right prong 16. Both prongs 16 and 17 end in front axle seats which hold front wheel 28. Front fork shaft 15 extends through head tube 3 and can rotate within head tube 3 about bearing 8. A left front peg 26 is attached to left front axle seat 19 laterally facing outward. A right front peg 25 is attached to right front axle seat 18 laterally facing outward. Front pegs 25 and 26 provide a temporary resting place for the rider's feet while performing tricks. Front pegs 25 and 26 may be an extension of the axle of front wheel 28.

Scooter 1 further comprises handlebar 20, which is connected to the upper end of front fork shaft 15. At least one brake lever 21 is located at one end of handlebar 20. Brake lever 21 is operatively connected to a rear brake 22 through a Bowden cable. Rear brake 22 may be attached to the rear end of upper frame tube 4 or to upper left and right fork arms 9 and 10. The Bowden cable may be routed through the inside of frame 2.

In an alternative embodiment with small wheels the scooter brake may be a traditional foot-operated rear brake located above rear wheel 27 at frame 2, in which case brake lever 21 will be omitted.

Figure 8:
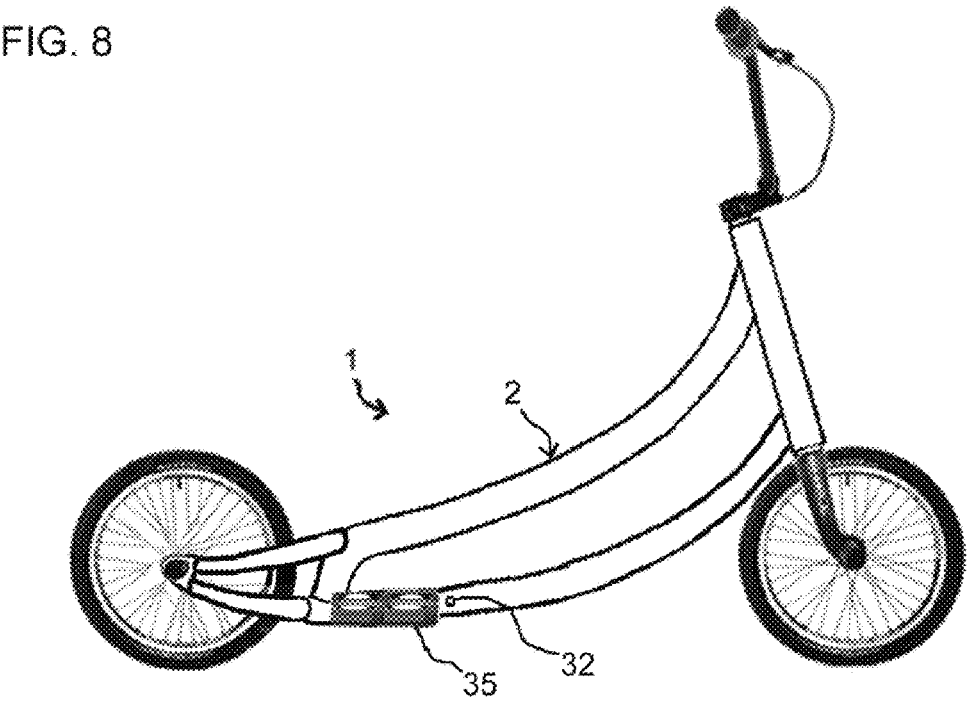
FIG. 8 is a side view of a scooter illustrating another alternative frame design according to an aspect of the invention.
Figure 9:
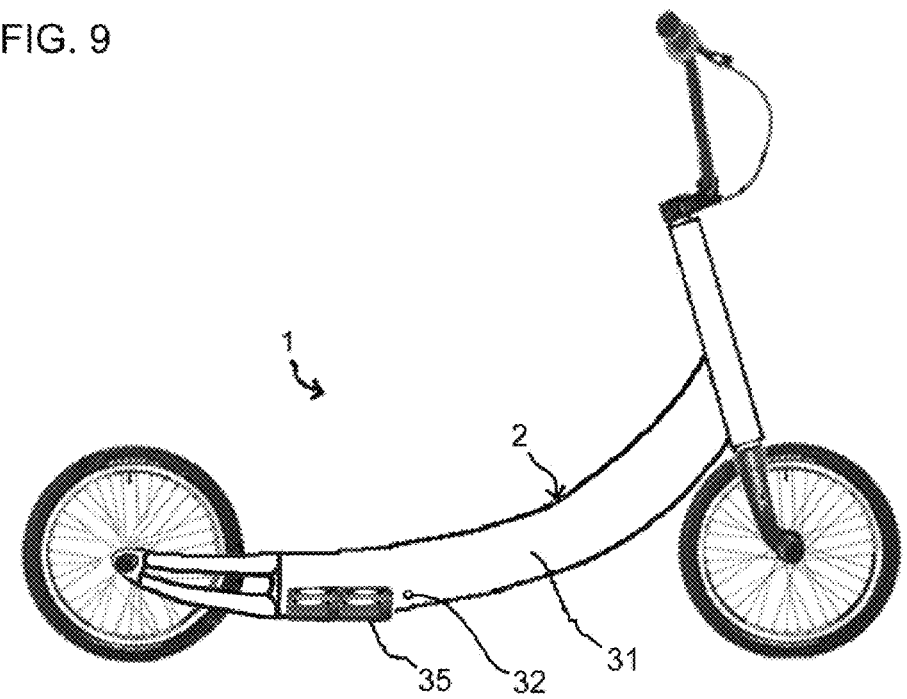
FIG. 9 is a side view of a scooter illustrating yet another frame design according to an aspect of the invention.

As illustrated in FIG. 8 and FIG. 9 footrests 6 and 7 may be substituted for an longitudinally adjustable footboard 35, which mounts to one of the attachment features 32, 33 or 34. Footboard 35 may be a single board wrapped around and extending laterally to both the left and right side of frame 2. Footboard 35 may also be formed as two elongated footrests mounted separately to each side of frame 2.

Lower frame tube 5 may comprise additional attachment features configured to attach plane slide protections at frame 2. Plane slide protections are known to be used in skateboarding. Here they may be used to protect frame 2 from wear when performing tricks that require sliding with the bottom of frame 2 along objects such as e.g. a handrail.

Figure 10:
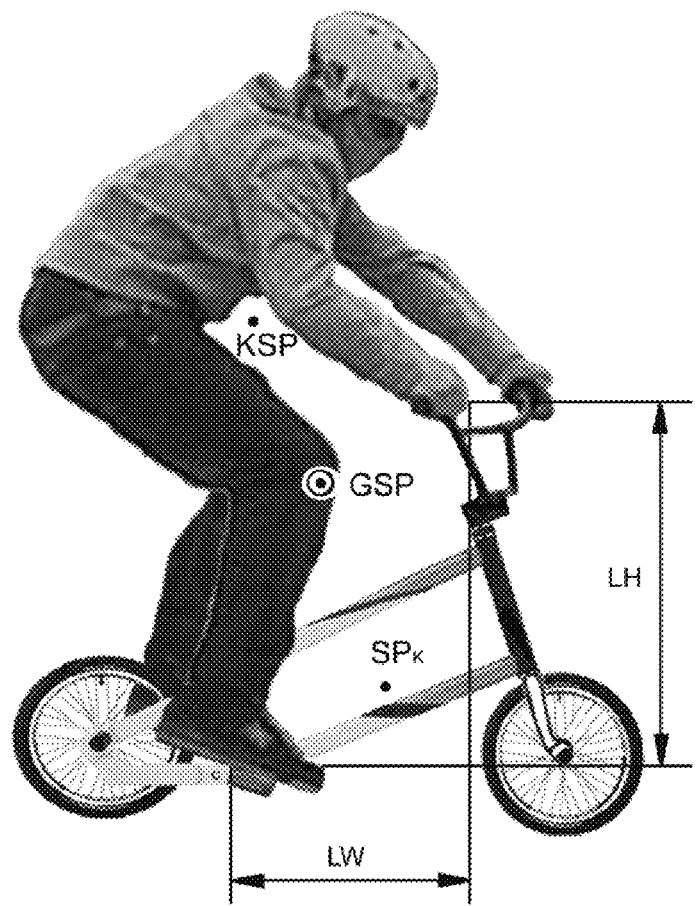
FIG. 10 is a side view of a scooter and rider illustrating proportions of the scooter and location of center of gravities of scooter, rider and both scooter and rider.

FIG. 10 illustrates advantageous proportions of scooter 1. Horizontal distance LW measures the distance from a vertical plane through footrests 6 and 7 to a vertical plane through the outer ends of handlebar 20, effectively measuring the horizontal distance between the feet and the hands of the rider. Vertical distance LH measures the distance from a horizontal plane through footrests 6 and 7 to a horizontal plane through the outer ends of handlebar 20, effectively measuring the vertical distance between feet and hands of the rider. To allow an optimal posture for freestyle riding the ratio of LH/LW should be about 3:2, i.e.

$$\frac{LH}{LW} \sim 1.5.$$

More specifically, to provide an optimal posture it should be $$1.4 < \frac{LH}{LW} < 1.6.$$

This allows using the scooter for riding on streets, and various freestyle disciplines such as park, pipe, slope style, dirt jump, race and downhill.

Attachment features 32, 33 and 34 are located to allow attaching footrests 6 and 7 in a horizontal position relative to the handle bar 20 that provides an optimal stance, even if the height of handle bar 20 is adjusted relative to front fork shaft 15. If handle bar 20 is raised footrests 6 and 7 may be moved closer to the rear wheel 27 to maintain the optimal proportions of LH/LW. Similarly, if handle bar 20 is lowered, footrests 6 and 7 may be attached closer to the front wheel 28, thus maintaining the optimal proportions of LH/LW.

Figure 5:
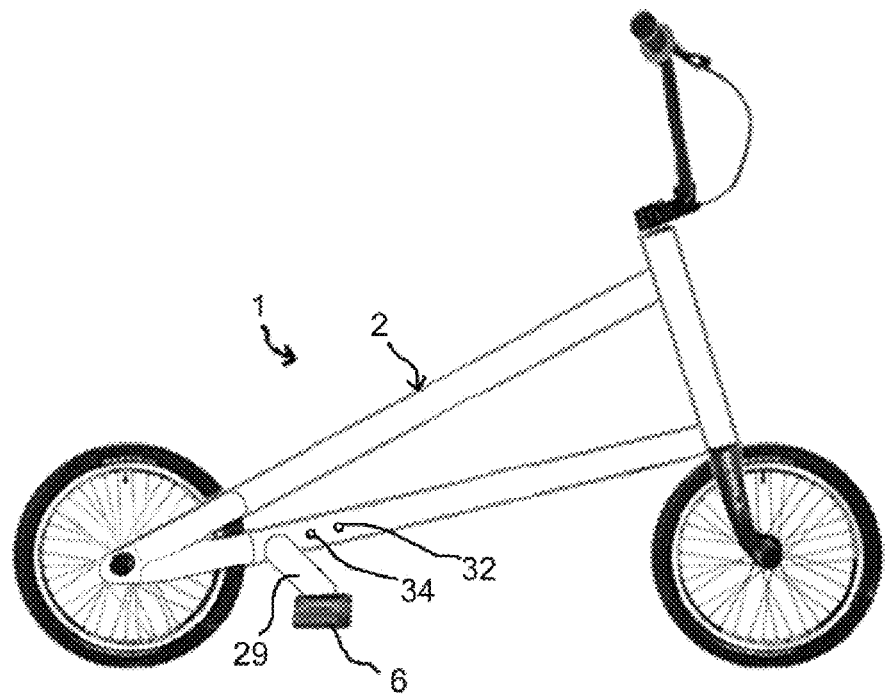
FIG. 5 is a side view illustrating an alternative embodiment of the scooter according to an aspect of the invention.

FIGS. 5 through 9 illustrate alternative embodiments in accordance with aspects of the present invention. As shown in FIG. 5 frame 2 may comprise a straight lower frame tube 5 having several unused attachment features 32, 34. In this embodiment footrests 6 and 7 are not mounted directly to lower frame tube 5, but rather to a footrest extension bar 29. Footrest extension bar 29 may be used to adjust the position of footrests 6 and 7 both vertically and horizontally by rotating footrest extension bar 29 around the selected attachment feature 32, 33, or 34 at lower frame tube 5, before firmly attaching it thereto. Once firmly attached the position of the footrests 6 and 7 is fixed relative to lower frame tube 5.

Figure 6:
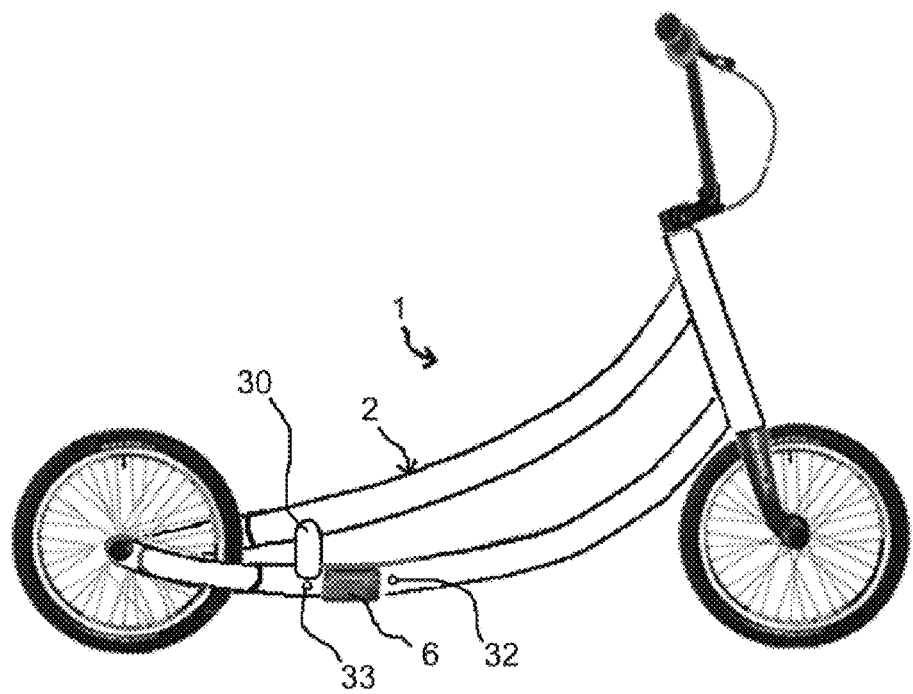
FIG. 6 is a side view illustrating another alternative embodiment of the scooter according to an aspect of the invention.
Figure 11:
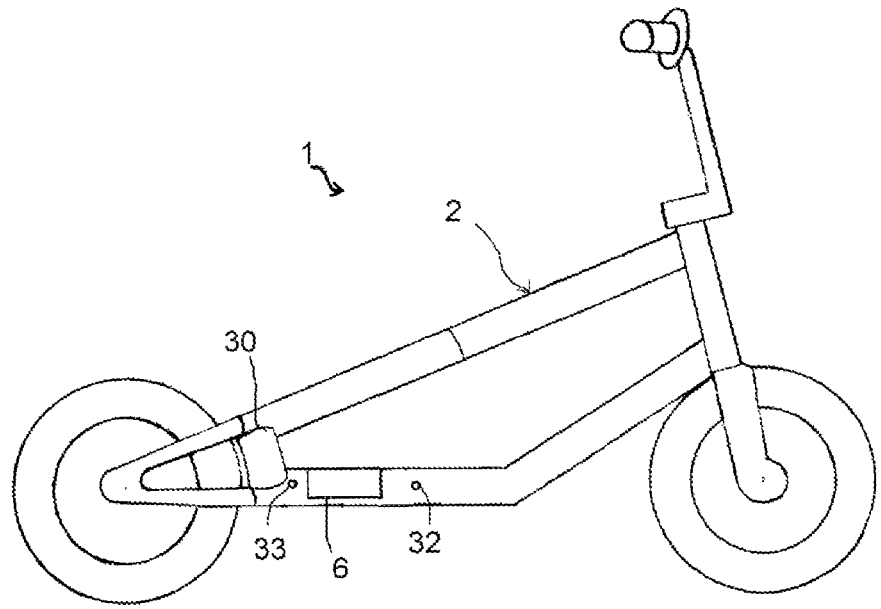
FIG. 11 is a side view of a scooter illustrating an alternative frame design with an additional vertical tube for improved rigidity.
Figure 12:
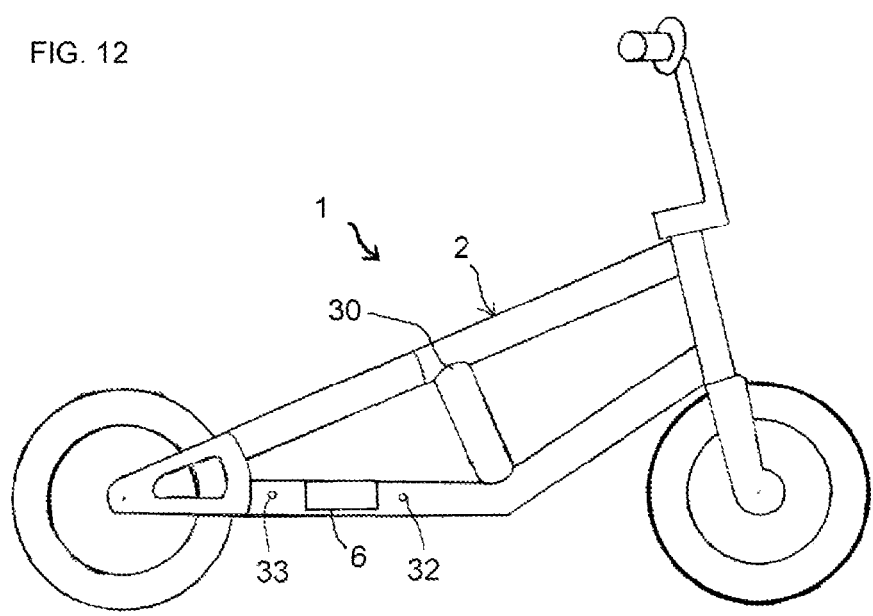
FIG. 12 is a side view of a scooter as in FIG. 11, showing the vertical tube in a different location.
Figure 13:
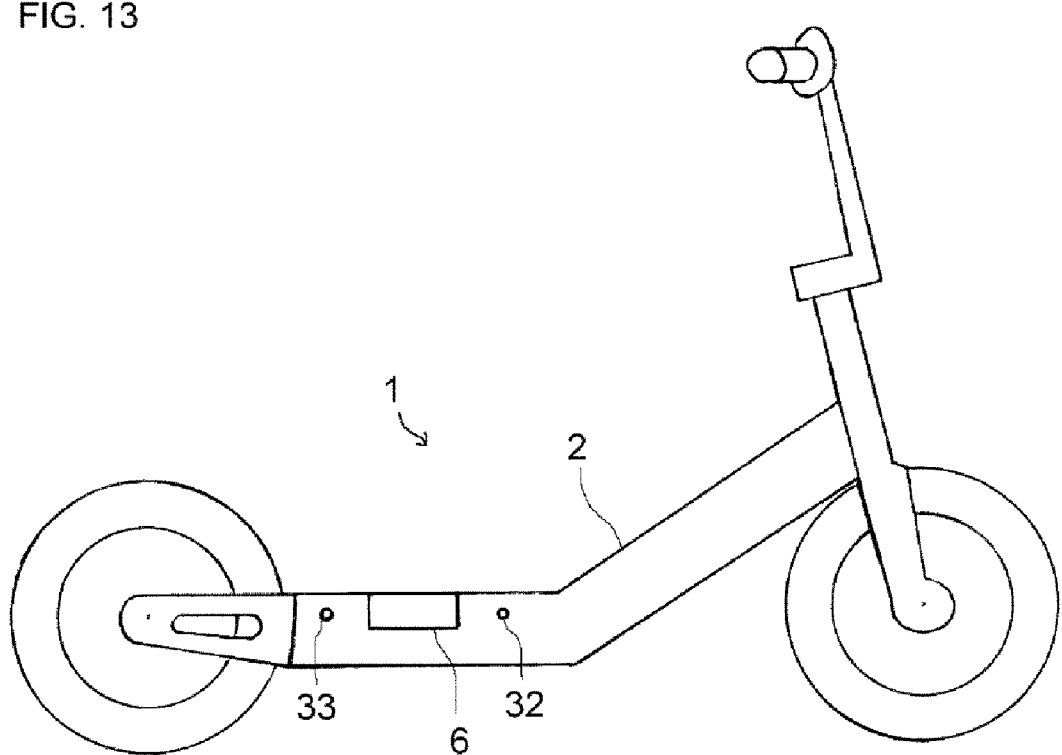
FIG. 13 is a side view of a scooter showing an alternative frame design.

FIG. 6 illustrates an alternative frame 2 comprising a connection tube 30 between upper frame tube 4 and lower frame tube 5. Connection tube 30 provides additional strength to frame 2, and increases the ability of frame 2 to absorb high forces acting on the frame while performing tricks, e.g. during jumps. As illustrated in FIG. 11 and FIG. 12 the location of connection tube 30 within frame 2 may vary.

Figure 7:
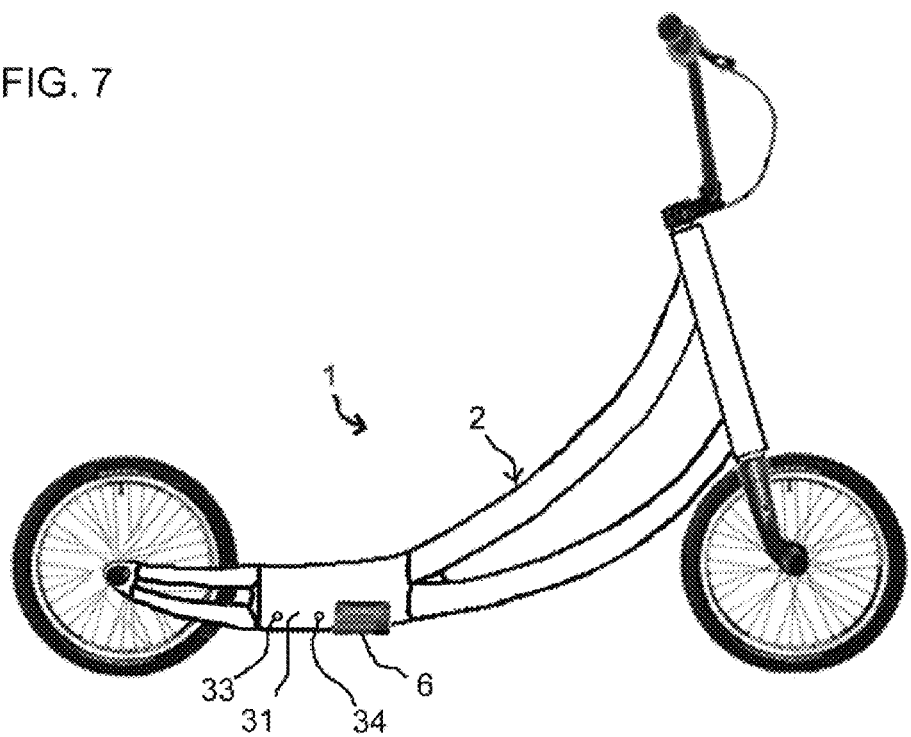
FIG. 7 is a side view of a scooter illustrating an alternative frame design according to an aspect of the invention.

FIG. 7 shows an alternative scooter embodiment in which upper frame tube 4 and lower frame tube 5 merge into a main tube 31 at their rear ends. Attached to the rear end of main tube 31 are the upper and lower fork arms 9, 10, 11 and 12 holding rear wheel 27.

FIG. 8 illustrates yet another exemplary embodiment in which upper frame tube 4 curves downward and joins lower frame tube 5 in front of rear wheel 27. Upper fork arms 9 and 10 are connected to the upper frame tube 5 at about its downward curve towards lower frame tube 4. Lower fork arms 11 and 12 are connected to lower frame tube 4. Instead of bicycle-pedal shaped footrests a footboard 35 is selectively attached to one of the attachment features 32, 33, and 34 (attachment features 33 and 34 are hidden behind footboard 35 and hence not shown) in frame 2.

Scooter frame 2 as shown in FIG. 9 utilizes a single main tube 31, which at its front end is attached to head tube 4 and which extends into upper fork arms 9 and 10 and lower fork arms 11 and 12 at its rear end. The diameter of main tube 31 may be larger than that of the head tube 4, causing main tube 31 to be torsionally stronger than head tube 4. As show a footboard 35 is selectively attached to one of several the attachment features 32, 33 and 34 in frame 2.

The scooter according to one aspect of the invention allows the rider a forward facing stance with both feet in parallel, resting on either footrests 6 and 7 or footboard 35, which is sufficiently wide to accommodate both feet.

Footrests 6 and 7 may pivot horizontally to compensate for tilt of the scooter when operating at various slopes, e.g. while operating within a half pipe. This provides a secure stance and allows the rider to maintain a combined center of gravity of rider and scooter safely above the scooter centrally between the front wheel 28 and rear wheel 27.

The various exemplary embodiments of frame 2 illustrate strong, torsionally rigid designs with low weight that allow using the scooter for freestyle tricks, e.g. sliding the frame along an object, or performing grabs at the upper frame portions.

Using a scooter according to an aspect of the present invention the rider stands in a forward facing posture on two footrests mounted on each side of the frame or a wide footboard. This is contrary to traditional scooter vehicles, in which the feet are typically turned out of the direction of travel.

The foot rests of a scooter according to an aspect of the invention are located such that the combined center of gravity of rider and scooter is substantially central between front and rear wheel; the foot rests are located low to further improve the stability when riding the scooter. This is an improvement over alternative scooter designs, e.g. the "All terrain trick scooter" US 2003/0132592 which locate the foot rests close to the rear wheels and mounted relatively high to the upper frame tube or main tube.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A scooter suitable for freestyle driving comprising, a frame;
    a front wheel;
    a rear wheel, the front wheel and the rear wheel being horizontally spaced apart by a predetermined wheel base;
    a front fork including a fork shaft and two prongs extending downwardly therefrom;
    two front axle seats connected to the lower ends of the prongs, the front wheel being connected to the front axle seats;
    a handlebar connected to the fork shaft of the front fork; and
    a footrest, selectively attached to one of two or more attachment features at the frame,
    wherein the attachment features are positioned to provide two or more selectable footrest positions between 50% of the wheel base distance rearward of the front wheel and 20% of the wheel base distance forward of the rear wheel, and
    wherein the position of the footrest is fixed relative to the frame when attached to the one of two or more attachment features.

2. The scooter as in claim 1, wherein the footrest comprises a left footrest and a right footrest, and
    wherein each footrest is attached selectively to one of the two or more attachment features at the frame, and each footrest extends laterally outward from the frame.

3. The scooter as in claim 2, wherein each footrest comprises a mounting axis, and wherein each footrest is configured to rotate around its mounting axis within a limited predetermined angular range.

4. The scooter as in claim 1, wherein the footrest comprises a footboard,
    the footboard being sufficiently wide to allow a rider to place both feet next to each other and parallel to the direction of travel.

5. The scooter as in claim 1, wherein the vertical distance LH of a horizontal plane through the center of the footrest to a horizontal plane through the outer ends of the handlebar is about 1.5 times the horizontal distance LW of a vertical plane through the footrest to a vertical plane through the outer ends of the handlebar.

6. The scooter as in claim 5, wherein LH/LW is between 1.4 and 1.6.

7. The scooter as in claim 1, further comprising front pegs extending outwardly from the front axle seats.

8. The scooter as in claim 1, further comprising rear pegs extending outwardly from the frame in an area around the rear wheel.

9. The scooter as in claim 1, wherein the height of the handlebar is adjustable relative to the front fork shaft.

10. The scooter as in claim 1, wherein the frame comprises a head tube;

an upper and a lower frame tube extending downward from said head tube, wherein the upper frame tube is connected to the head tube above the lower frame tube;

two upper rear fork arms extending out from the rear end of the upper frame tube; and two lower rear fork arms extending out from the rear end of the lower frame tube.

11. The scooter as in claim 10, further comprising a connection tube located between the upper and the lower frame tube.

12. The scooter as in claim 10, further comprising a main tube between the upper and the lower frame tube, and the upper and the lower rear fork arms.

13. The scooter as in claim 1, wherein the two or more attachment features are threaded openings on the frame allowing a footrest to be screwed therein.

14. A scooter suitable for freestyle driving comprising,
a torsionally rigid frame, the frame comprising
a head tube,
an upper and a lower frame tube extending downward from said head tube, wherein the upper frame tube is connected to the head tube above the lower frame tube,
two upper rear fork arms extending directly out from the rear end of the upper frame tube,
two lower rear fork arms extending directly out from the rear end of the lower frame tube,
a pair of rear axle seats attached to each said upper and lower rear fork arms,
a rear wheel connected to said rear axle seats,
a front fork including a fork shaft and two prongs extending downwardly therefrom,
a pair of front axle seats attached to the lower end of said prongs,
a front wheel connectable to said front axle seats,
a handlebar connectable to said fork shaft of said front fork,
two or more attachment features located at the lower frame tube, configured to attach a left and a right footrest thereto, and
a left footrest and a right footrest attached to one of the two or more attachment features,
wherein the two or more attachment features are threaded openings allowing the left footrest and the right footrest to be screwed therein.

15. The scooter as in claim 14 wherein the height of the handlebar is adjustable.

16. The scooter as in claim 14, wherein the upper frame tube and the upper rear fork arms extend in a straight line.

17. A scooter suitable for freestyle driving comprising,
a torsionally rigid frame, the frame comprising
a head tube,
a frame tube extending downward from said head tube,
a pair of rear fork arms extending directly out from the rear end of the frame tube,
a pair of rear axle seats attached to the rear fork arms,
a rear wheel connected to said rear axle seats,
a front fork including a fork shaft and two prongs extending downwardly therefrom,
a pair of front axle seats attached to the lower end of said prongs,
a front wheel connectable to said front axle seats,
a handlebar connectable to said fork shaft of said front fork, and
a footrest firmly attached to the frame at a fixed position,
wherein the front wheel and the rear wheel are spaced apart by a wheel base, and
wherein the lateral position of the footrest is adjustable between 20% and 50% of the wheel base distance forward of the rear wheel.

18. The scooter as in claim 17, wherein the footrest comprises a left footrest and a right footrest, and
wherein each footrest is mounted selectively to one of two or more attachment features at the frame, and each footrest extends laterally outward from the frame.

19. The scooter as in claim 17, wherein the horizontal distance LW of a vertical plane through the center of the footrest to a vertical plane through the outer ends of the handlebar is about 1.5 times the vertical distance LH of a horizontal plane through the footrest to a horizontal plane through the outer ends of the handlebar.

20. The scooter as in claim 18, wherein the footrests are attached to footrest extensions bars, and wherein the footrest extensions bars are attached to the frame.

* * * * *